United States Patent
Archer et al.

[15] 3,678,036
[45] July 18, 1972

[54] 2-SUBSTITUTED AMINO-1,4-BENZODIAZEPINE

[72] Inventors: Giles Allan Archer, Essex Fells; Leo Henryk Sternbach, Upper Montclair, both of N.J.

[73] Assignee: Hoffmann-La Roche Inc., Nutley, N.J.

[22] Filed: Sept. 20, 1968

[21] Appl. No.: 761,307

Related U.S. Application Data

[63] Continuation-in-part of Ser. Nos. 208,951, Sept. 10, 1962, Pat. No. 3,422,091, and Ser. No. 323,884, Nov. 15, 1963, abandoned.

[52] U.S. Cl. ............260/239 BD, 260/239.3 D, 260/247.1, 260/247.2 A, 260/247.5 B, 260/293.59, 260/326.3, 260/326.5 CA, 260/326.81, 260/454, 260/562 B, 260/570 AB, 424/244, 424/267
[51] Int. Cl.............C07d 53/06, C07d 57/00, C07d 99/02
[58] Field of Search ..........260/239 BD, 247.1, 247.2, 247.5, 260/293 D, 293.4, 294 A, 294.7 G, 326.3, 326.5, 326.81 S, 326.81 R, 326.81 G

[56] References Cited

UNITED STATES PATENTS

| | | | |
|---|---|---|---|
| 3,419,545 | 12/1968 | Farber | 260/239 |
| 3,462,419 | 8/1969 | Spencer | 260/239 |

*Primary Examiner*—Alton D. Rollins
*Attorney*—Samuel L. Welt, Jon S. Saxe, Bernard S. Leon, William G. Isgro and George M. Gould

[57] ABSTRACT

1,4-Benzodiazepines bearing in position-2, either a disubstituted amino group or an

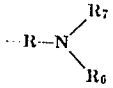

group wherein R is lower alkylene and $R_6$ and $R_7$ are either lower alkyl or together with the nitrogen atom form a heterocyclic moiety or an NH-R-phenyl grouping wherein R is as above and certain 4-oxides thereof. Such compounds are useful as muscle relaxants, sedatives and anticonvulsants.

15 Claims, No Drawings

2-SUBSTITUTED AMINO-1,4-BENZODIAZEPINE

RELATED APPLICATIONS

This application is a continuation-in-part of U.S. Pat. application Ser. No. 208,951, filed Sept. 10, 1962 now U.S. Pat. No. 3,422,091 issued Jan. 14, 1969 and U.S. Pat. application Ser. No. 323,884, filed Nov. 15, 1963, now abandoned both filed in the names of Giles Alan Archer and Leo Henryk Sternbach. The benefit of the filing dates of these earlier filed pending applications is hereby claimed.

DETAILED DESCRIPTION

This invention in one aspect relates to the use of sulfur containing heterocyclic compounds as intermediates and the novel products preparable therefrom. More particularly, the referred to sulfur-containing heterocyclic compounds are selected from the group consisting of compounds of the formula:

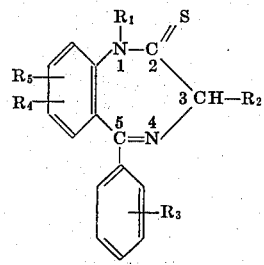

I and their pharmaceutically acceptable acid addition salts; wherein $R_1$ is selected from the group consisting of hydrogen, lower alkyl and lower alkenyl; $R_2$ is selected from the group consisting of hydrogen and lower alkyl; $R_3$, $R_4$ and $R_5$ are each selected from the group consisting of hydrogen, halogen, trifluoromethyl, lower alkyl, lower alkylthio, lower alkyl-sulfinyl, lower alkyl-sulfonyl, cyano, amino, lower alkanoyl-amino, nitro, di-lower alkylamino and lower alkoxy.

The numbering of the heterocyclic portion of the benzodiazepine ring is shown in formula I above for the purposes of convenience.

As used herein, the term lower alkyl refers to both straight and branched chain alkyl groups such as methyl, ethyl, isopropyl, and the like. The term halogen includes all four halogens. The term lower alkylthio refers to groups such as methylmercapto and the like. The term di-lower alkylamino refers to groups such as dimethylamino and the like. The term lower alkoxy refers to groups such as methoxy and the like. The term lower alkanoyl refers to the acyl residue of lower alkanoic acids, for example, acetyl, propionyl, and the like.

The compounds of formula I above can be prepared by treating a corresponding compound of the formula:

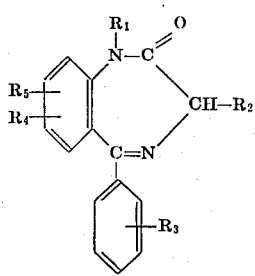

II wherein $R_1$, $R_2$, $R_3$, $R_4$ and $R_5$ have the same meaning as above with a sulfide, such as phosphorus pentasulfide. The reaction is preferably conducted at reflux in an organic solvent such as pyridine, xylene, or the like. Pyridine is the preferred solvent and there is advantageously used an excess of sulfide, for example, phosphorus pentasulfide.

The compounds of formula I above and their pharmaceutically acceptable acid-addition salts are useful as anticonvulsants, sedatives, and muscle relaxants. They also are useful as chemical intermediates; for example, they can be converted into compounds of the formula:

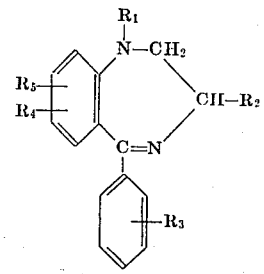

III wherein $R_1$ and $R_2$ have the same meaning as above; and $R_3$, $R_4$ and $R_5$ are selected from the group consisting of hydrogen, halogen, trifluoromethyl, lower alkyl, lower alkyl-sulfinyl, lower alkyl-sulfonyl, cyano, amino, lower alkanoylamino, nitro, di-lower alkylamino, and lower alkoxy.

These latter compounds are useful as anticonvulsants, muscle relaxants, and sedatives. Such compounds and their preparation from compounds of formula I are not a part of this invention, but are disclosed herein in order that this disclosure may be more complete.

The compounds of formula I above can also be reacted with primary or secondary amines, yielding corresponding compounds wherein the 2-position bears a primary or secondary amino group. The amines which can be used in this reaction include lower alkylamines, di-lower alkylamines, heterocyclic amines containing a secondary nitrogen atom such as piperidino and the like, and lower alkylamines bearing on a carbon atom a substituent selected from the group consisting of phenyl, di-lower alkylamino and 5 to 6 membered heterocyclic amines containing one to two hetero atoms selected from the group consisting of nitrogen and oxygen, such as piperidino and morpholino. Thus, exemplary of primary amines which can be used are compounds of the formula:

H$_2$N-lower alkyl

H$_2$N-lower alkylene-phenyl

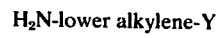
H$_2$N-lower alkylene-Y

H$_2$N-lower alkylene-N-(lower alkyl)$_2$ and exemplary of secondary amines are compounds of the formulas:

HN-(lower alkyl)$_2$

H—Y

In the above formulas Y represents the residue of a 5 to 6 membered heterocyclic amine containing one to two hetero atoms selected from the group consisting of nitrogen and oxygen (at least one, of course, must be nitrogen) devoid of a hydrogen atom on at least one hetero-nitrogen atom such as, for example, groups such as morpholino and piperidino.

The above amination can be effected directly or, in the alternative, the compounds of formula I above can first be converted into a compound of the formula:

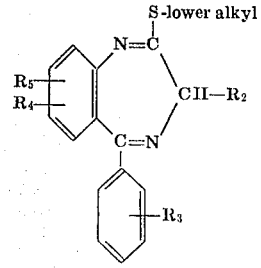

IV wherein $R_2$, $R_3$, $R_4$ and $R_5$ have the same meaning as above, and these latter compounds of formula IV can then be reacted with the primary or secondary amines. The conversion of the compounds of formula I into a compound of formula IV can be effected, for example, by forming the sodium salt of the compound of formula I and alkylating said sodium salt with an alkylating agent, such as alkyl halides as methyl iodide, ethyl chloride or the like, or dimethylsulfate.

The introduction of an amino group into the 2-position can be effected by treating a compound of formula I or of formula IV with the amine. The reaction can be conducted with the amine, with or without employment of a solvent. The amine can be used in excess and serve as the reaction medium, or a conventional inert organic solvent such as a lower alkanol, as methanol, ethanol, or the like, a hydrocarbon, as benzene, toluene, or the like, an ether, dioxane, tetrahydrofuran, or the like. The amination can be conducted at room temperature or elevated temperatures, in the case when a solvent is used, up to the boiling point of the solvent.

When secondary amines are used, novel compounds heretofore unobtainable by known processes are obtained via the abovementioned amination. These compounds are of the formula:

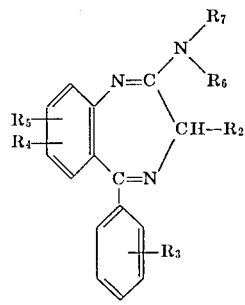

V wherein $R_2$, $R_3$, $R_4$ and $R_5$ have the same meaning as above; and $R_6$ and $R_7$ are selected from the group consisting of, individually, lower alkyl and, taken together with the nitrogen atom to which they are joined, a 5 to 6 membered heterocyclic ring containing one to two heterocyclic atoms selected from the group consisting of nitrogen and oxygen.

Other novel compounds obtainable by the amination processes are of the formula:

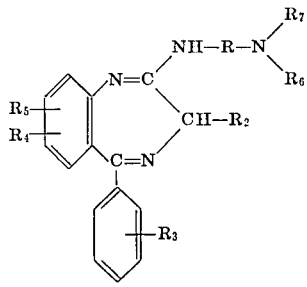

VI wherein $R_2$, $R_3$, $R_4$, $R_5$, $R_6$ and $R_7$ have the same meaning as above; and R is lower alkylene.

The compounds of formulas V and VI above and their pharmaceutically acceptable acid addition salts, as well as other 2-amino compounds obtainable by the above-mentioned amination process and their pharmaceutically acceptable acid addition salts are useful as anticonvulsants, sedatives, and muscle relaxants.

Compounds of formulas V and VI as well as other compounds prepared by the above amination processes utilizing compounds of formula I as intermediates form pharmaceutically acceptable acid addition salts with both organic and inorganic pharmaceutically acceptable acids such as, for example, hydrochloric acid, hydrobromic acid, phosphoric acid, sulfuric acid, nitric acid, citric acid, acetic acid, p-toluene sulfonic acid, succinic acid and the like.

The compounds of formulas V and VI and the like and pharmaceutically acceptable acid addition salts thereof can be administered internally, for example, orally or parenterally, in the form of conventional pharmaceutical preparations, with dosage amounts adjusted to individual requirements. For example, they can be administered in conventional solid forms such as tablets, capsules, dragees, and the like, so they can be administered in conventional liquid forms such as solutions, suspensions, emulsions or the like.

Another aspect of the present invention relates to compounds of the formula

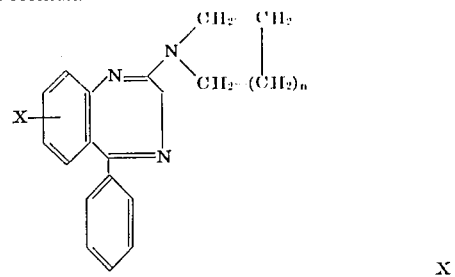

X wherein $n$ is 1–2, and $x$ is selected from the group consisting of hydrogen and chloro, and the 4-oxide thereof.

Compounds of the formula X above which do not contain oxygen in position-4 are prepared in the manner set forth hereinabove. Compounds of the formula X above which contain oxygen in position-4 can be prepared by the process described hereinafter.

The last mentioned process in its broadest aspect comprises reacting a compound of the formula

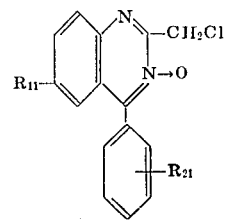

XI wherein $R_{11}$ and $R_{21}$ are selected from the group consisting of hydrogen, lower alkyl, halogen and trifluoromethyl with a compound of the formula

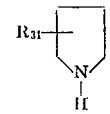

XII wherein $R_{31}$ is selected from the group consisting of hydrogen and lower alkyl.

By proceeding accordingly, novel compounds in addition to those encompassed by the formula X above are obtained. Such novel compounds are selected from the group consisting of compounds of the formula

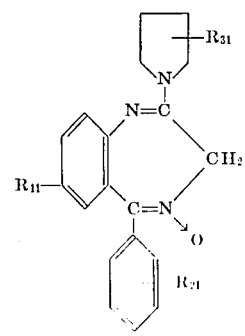

XIII wherein $R_{11}$, $R_{21}$ and $R_{31}$ are as above and pharmaceutically acceptable acid addition salts thereof.

In a preferred aspect of the embodiment of the present invention, $R_{11}$ of formula XIII above is halogen, advantageously chlorine, and $R_{21}$ is hydrogen or halogen. If $R_{21}$ be halogen, fluorine and the ortho position in the phenyl ring are preferred. Particularly good results are achieved when pyrrolidine is reacted with a compound corresponding to formula XI above.

The reaction of a compound of formula XI above with a compound of formula XII above is preferably effected in a solvent medium. If an excess of a compound of formula XII above is provided, such compound per se can function as the solvent medium. However, any suitable organic solvent can be utilized, such as ether, tetrahydrofuran, a lower alkanol such as methanol and the like.

The term "lower alkyl", as used throughout the disclosure, comprehends both straight and branched chain hydrocarbon groups such as methyl, ethyl, n-propyl, isopropyl and the like. The term "halogen", as used throughout the disclosure, is intended to encompass all four forms thereof, i.e., chlorine, bromine, fluorine and iodine. Preferred are chlorine, fluorine and bromine.

Compounds having the formula XIII above, are useful as sedatives and anticonvulsants. These substances may be administered orally or parenterally in the form of the base or medicinally acceptable salts thereof, in conventional dosage forms such as tablets, capsules, powders, injectables and the like.

Compounds of the formulas X and XIII above form pharmaceutically acceptable acid addition salts by reaction thereof with inorganic acids such as mineral acids, e.g., hydrohalic acids, for example, hydrochloric, hydrobromic and the like, nitric acid, sulfuric acid, phosphoric acid and organic acids such as acetic acid, oxalic acid, succinic acid and the like. Such acid addition salts are also within the scope of the present invention.

The foregoing is a description of new and novel compounds and to new, novel and useful processes for the preparation of such compounds. It will be readily apparent to one skilled in the art that variations of these procedures are possible.

It is of course self evident that the compound of the formula I above which is aminated or is converted into a compound of the formula IV above is unsubstituted, i.e., bears hydrogen in position-1.

The following examples are illustrative but not limitative of the procedure for the preparation of the 2-substituted-1,4-benzodiazepines. All temperatures stated are in degrees centigrade.

EXAMPLE 1

A solution of 7-chloro-5-phenyl-3H-1,4-benzodiazepin-2 (1H)-one (271 gm.) in anhydrous pyridine (2L, freshly distilled from barium oxide) was treated with phosphorus pentasulfide (242 gm.) and stirred and heated under reflux for 0.5 hour, with protection from atmospheric moisture. The reaction mixture was then immediately chilled in an ice-bath, the dark colored pyridine solution transferred to a separating funnel and added slowly to a well-stirred solution of sodium chloride (1500 gm.) in water (5L) while maintaining the temperature of the mixture at <10° by ice-cooling. The crude product precipitated as a dark brown amorphous solid which was collected, washed with water and dried at 80°. This material was recrystallized from each of nitrobenzene-benzene-petroleum ether, ethanol and aqueous acetone. In an alternative method of purification, the crude product was dissolved in methylene chloride (4–5L) and the resulting solution filtered through a short chromatography column containing "Woelm" neutral alumina, activity III (1 Kg.); concentration of the filtrates and dilution with petroleum ether then gave crystalline product. Further recrystallization from ethanol gave pale yellow prisms of 7-chloro-5-phenyl-3H-1,4-benzodiazepin-2-(1H)-thione melting at 244°–246°.

In an alternative method of preparation, anhydrous xylene (2L) was used as solvent instead of pyridine, and refluxing of the reaction mixture was contained was continued for 2 hours. After cooling the mixture, the crude product was recovered by filtration and was purified by dissolution in dilute sodium hydroxide solution and reprecipitation by neutralization with hydrochloric acid. Further purification by chromatography over alumina, as previously, then gave an impure crystalline product. This material required several more recrystallizations for complete purification.

Twenty g. of 7-chloro-5-phenyl-3H-1,4-benzodiazepin-2(1H)-thione in 500 ml. of acetone was treated with washed Raney nickel (20 tsp., approximately 60 g., dry basis) and heated under reflux for two hours. The washed Raney nickel was obtained by washing Raney nickel (activity about $W_2$) thoroughly with water until the washings were neutral, then with ethanol and finally with acetone. The reaction mixture obtained above was cooled, the Raney nickel filtered off and then washed with ethanol. The combined filtrates were evaporated, the residue dissolved in methylene chloride and the resulting solution washed with water, dried over magnesium sulfate and evaporated to yield a residue which was then dissolved in ether. The resulting ether solution was extracted with ice cold 1N hydrochloric acid solution and this aqueous solution then treated with dilute sodium hydroxide causing precipitation. The product was extracted into ether, the extract washed with water until neutral, dried over magnesium sulfate and evaporated to give a brown gum. This was then dissolved in methanol and 2N hydrochloric acid in methanol (1.1 equivalents) added thereto. Ether and petroleum ether were added causing the precipitation of the hydrochloride of the reaction product. The hydrochloride was reconverted to free base by treatment with cold dilute sodium hydroxide solution and extraction of the free base into ether. The extracts, after washing with water and drying over magnesium sulfate yielded the base on evaporation. The so-obtained crude product was recrystallized from methylene chloride-hexane and then from aqueous ethanol, forming yellow plates of 7-chloro-5-phenyl-1,2-dihydro-3H-1,4-benzodiazepine.

The above-mentioned 7-chloro-5-phenyl-1,2-dihydro-3H-1,4-benzodiazepine and its preparation from 7-chloro-5-phenyl-3H-1,4-benzodiazepine-2(1H)-thione are not a part of this invention, but such as disclosed hereinabove in order that this disclosure may be complete.

7-Chloro-5-phenyl-3H-1,4-benzodiazepine-2(1H)-thione was converted to 7-chloro-2-methylmercapto-5-phenyl-3H-1,4-benzodiazepine via the following procedures:

2.87 g. of 7-chloro-5-phenyl-3H-1,4-benzodiazepine-2(1H)-thione was dissolved in a mixture of a 15 ml. of methanol and 12.1 ml. of aqueous 1N sodium hydroxide. The solution was stirred and treated dropwise with a solution of 1.39 g. of dimethylsulfate in methanol over 0.5 hour. Stirring was continued for a further 10 minutes and then 20 ml. of water was added, followed by 10 ml. of aqueous 3N sodium hydroxide. After stirring for a further 15 minutes, the precipitated product was filtered off, washed with water, dried in vacuo, and recrystallized several times from ethanol, yielding 7-chloro-2-methylmercapto-5-phenyl-3H-1,4-benzodiazepine as pale yellow prisms melting at 132°–134°.

In an alternate method of preparing the same product, 150 g. of 7-chloro-5-phenyl-3H-1,4-benzodiazepine-2(1H)-thione was mixed with 1,300 ml. of methanol and 578 ml. of aqueous 1N sodium hydroxide. The mixture was stirred and treated dropwise with a solution of 82.5 g. of methyl iodide in 100 ml. of methanol over 20 minutes. Stirring was then continued for a further 40 minutes after which the mixture was concentrated in vacuo at 25° to remove the more volatile solvents. The residue was mixed with 1,000 ml. of water and the resulting precipitated product extracted with methylene chloride, the extract washed with water, dried over anhydrous sodium sulfate, and evaporated, giving the crude product as an oil which upon crystallization from aqueous ethanol, yielded yellow prisms of 7-chloro-2-methylmercapto-5-phenyl-3H-1,4-benzodiazepine, melting at 125°–128° undepressed on mixed melting point determination with a sample of the compound obtained via the method described in the paragraph immediately above.

EXAMPLE 2

A solution of 7-chloro-1-methyl-5-phenyl-3H-1,4-benzodiazepin-2(1H)-one (14.3 gm.) in anhydrous pyridine (100 ml.) was treated with phosphorus pentasulfide (11.1 gm.) and stirred and heated under reflux for 0.75 hour, with protection from atmospheric moisture. The pyridine was distilled off in vacuo, the tarry residue was dissolved in methylene chloride and the solution filtered through a short chromatography column containing "Woelm" neutral alumina, activity III (200 gm.). Concentration of the filtrates and addition of petroleum ether gave as a crude product 7-chloro-1-methyl-5-phenyl-3H-1,4-benzodiazepine-2(1H)-thione, which upon recrystallization from benzene-hexane and then from ethanol formed pale yellow prisms melting at 162°–164°.

Twenty g. of 7-chloro-1-methyl-5-phenyl-3H-1,4-benzodiazepine-2(1H)-thione in 500 ml. of acetone was treated with 20 tsp. (app. 60 g., dry basis) of the washed Raney nickel described above in example 1, and the resulting mixture heated under reflux for 2 hours. The reaction mixture was then cooled and the Raney nickel filtered off and washed with ethanol. The combined filtrates were evaporated, the residue dissolved in methylene chloride, the resulting solution washed with water, dried over magnesium sulfate and evaporated. The residue was then dissolved in ether, the basic product extracted into ice cold 1N hydrochloric acid solution and then reprecipitated by the basification of the aqueous solution with dilute sodium hydroxide solution. The product was extracted into ether, the extract washed with water until neutral, dried over magnesium sulfate and evaporated. The residue was then dissolved in methanol and 2N hydrochloric acid in methanol (1.1 equivalents) added thereto. Ether and petroleum ether were then added causing the precipitation of 7-chloro-1-methyl-5-phenyl-1,2-dihydro-3H-1,4-benzodiazepine hydrochloride as orange needles. The hydrochloride was reconverted to the free base by treatment with cold dilute sodium hydroxide solution and extraction of the free base into ether. The extracts were washed with water, dried over magnesium sulfate, and evaporated yielding the free base which upon being recrystallized several times from pentane at −70° gave very pale yellow prisms melting at 95°–97°.

The base was reconverted to the corresponding hydrochloride by treatment with methanolic hydrochloric acid followed by precipitation of the hydrochloride by addition of ether and petroleum ether. The hydrochloride so obtained, upon recrystallization from a mixture of methanol and ether, formed orange needles melting at 259°–260°.

The above-mentioned 7-chloro-1-methyl-5-phenyl-1,2-dihydro-3H-1,4-benzodiazepine and its preparation from 7-chloro-1-methyl-5-phenyl-3H-1,4-benzodiazepine-2(1H)-thione are not a part of this invention, but such are disclosed hereinabove in order that this disclosure may be complete.

EXAMPLE 3

A solution of 7-chloro-5-(2-chlorophenyl)-3H-1,4-benzodiazepin-2(1H)-one (30.5gm.) in anhydrous pyridine (200 ml.) was treated with phosphorus pentasulfide (24.2 gm.) and stirred and heated under reflux for 0.5 hour, with protection from atmospheric moisture. The reaction mixture was then immediately chilled in an ice-bath, the dark colored pyridine solution transferred to a separating funnel and added slowly to a well-stirred solution of sodium chloride (150 g.) in water (.5L) while maintaining the temperature of the mixture at <10° by ice cooling. The product precipitated as an oil. This was extracted into methylene chloride, the extract was washed with water, dried over magnesium sulfate and evaporated in vacuo to remove solvent and remaining pyridine. The tarry residue was dissolved in methylene chloride and the solution was filtered through a short chromatography column containing "Woelm" neutral alumina, activity III (500 gm.). Concentration of the filtrates and addition of petroleum ether gave a crystalline product which upon further crystallization from ethanol gave pale yellow needles of 7-chloro-5-(2-chlorophenyl)-3H-1,4-benzodiazepine-2(1H)-thione melting at 251°–253°.

Washed Raney nickel was obtained as described above in example 1. A mixture of 500 ml. of acetone and 20 g. of 7-chloro-5-(2-chlorophenyl)-3H-1,4-benzodiazepine-2(1H)-thione was treated with 20 tsp. (app. 60 g., dry basis) of the washed Raney nickel, then heated under reflux for 2 hours, cooled and the Raney nickel filtered off and washed with ethanol. The resulting filtrates were combined and evaporated, yielding a residue which was dissolved in methylene chloride. The resulting solution was washed with water, dried over magnesium sulfate, and evaporated. The so-obtained residue was then dissolved in ether and the resulting solution extracted with ice cold 1N hydrochloric acid solution and the resulting aqueous solution then treated with dilute sodium hydroxide solution causing precipitation. The product was extracted into ether, the extract washed with water until neutral, dried over magnesium sulfate, and evaporated to give a brown gum. This was dissolved in methanol and 2N hydrochloric acid in methanol (1.1 equivalents) added to the resulting solution, and precipitation effected by the addition of ether and petroleum ether. This yielded the hydrochloride of the reaction product, i.e., 7-chloro-5-(2-chlorophenyl)-1,2-dihydro-3H-1,4-benzodiazepine hydrochloride, which was reconverted to the free base by treatment with cold dilute sodium hydroxide solution and extraction of the free base into ether. The extracts, after washing with water and drying over magnesium sulfate, yielded the base on evaporation. The latter was recrystallized from benzene-hexane and formed pale yellow prisms, m.p. 174°–175°.

The above-mentioned 7-chloro-5-(2-chlorophenyl)-1,2-dihydro-3H-1,4-benzodiazepine and its preparation from 7-chloro-5-(2-chlorophenyl)-3H-1,4-benzodiazepine-2(1H)-thione are not a part of this invention, but such as disclosed hereinabove in order that this disclosure may be complete. Also, 7-chloro-5-(2-chlorophenyl)-3H-1,4-benzodiazepin-2(1H)-one, its preparation and intermediates therefor, are not a part of this invention, but such are disclosed hereinbelow in order that this disclosure may be complete.

To a solution of 100 g. of 2amino-2',5-dichlorobenzophenone in 400 ml. of toluene, 35 ml. of chloroacetyl chloride was added dropwise with stirring. After the solution had cooled to 25°, 220 ml. of 2 N sodium hydroxide was added cautiously and the mixture stirred for 30 minutes. Crystals which separate were filtered off after cooling. The toluene was concentrated in vacuo to yield another crop of crystals. Recrystallization from methanol gave 2-(2-chloroacetamido)-2',5-dichlorobenzophenone as white needles melting at 157°–159°.

2-(2-Chloroacetamido)-2',5-dichlorobenzophenone (50 g.) was dissolved in 500 ml. of dimethylformamide and placed into a three-necked flask equipped with gas inlet tube, stirrer and dry ice condenser. Liquid ammonia (200 ml.) was passed into the solution until a steady reflux of ammonia was observed. After ca. 5 hours the cooling was discontinued and the excess of ammonia was allowed to evaporate overnight. Twenty-four hours after the reaction had been started the dimethylformamide was distilled off on a steam bath under reduced pressure (ca. 20 mm.).

The residue was dissolved in 1,000 ml. of pyridine and refluxed for 20 hours. After this time the solvent was removed in vacuo and the residue treated with water and ether. The organic phase was repeatedly washed with water and concentrated. Crude crystals separated and were recrystallized from methanol yielding colorless crystals of 7-chloro-5-(2-chlorophenyl)-3H-1,4-benzodiazepin-2(1H)-one melting at 199°–201°.

EXAMPLE 4

1.0 mole of 5-phenyl-3H-1,4-benzodiazepin-2(2H)-one in anhydrous pyridine (2 l., freshly distilled from barium oxide) was treated with 242 g. of phosphorus pentasulfide and the mixture was stirred and refluxed for 0.75 hour with protection from atmospheric moisture. The reaction mixture was then immediately chilled in an ice bath with stirring and the dark-colored pyridine solution was transferred to a separating funnel and added slowly to a well-stirred solution of 1,500 g. sodium chloride in 5 l. of water, keeping the temperature of the reaction mixture at less than 10° by the ice-cooling. The crude product precipitated as a gum which was extracted with methylene chloride. The extracts were washed with water, dried over anhydrous sodium sulfate and passed through a short chromatography column containing "Woelm" activity III, neutral alumina. Concentration of the eluate, and addition of petroleum ether gave the purified product as khaki-colored needles which were dissolved in methylene chloride and rechromatographed on a column of "Woelm" activity III, neutral alumina. The eluate was concentrated and the residue repeatedly crystallized from ethanol yielding 5-phenyl-3H-1,4-benzodiazepine-2(1H)-thione as pale yellow needles melting at 256°–257°.

EXAMPLE 5

One mole of 7-nitro-5-phenyl-3H-1,4-benzodiazepin-2(1H)-one was treated with phosphorus pentasulfide according to the method described in the example 4 above yielding, upon addition of the petroleum ether, a brown gum which was dissolved in dilute aqueous sodium hydroxide. The resulting solution was extracted with ether and the aqueous layer was then acidified with dilute hydrochloric acid to a pH of 4–6. The resulting precipitate was filtered off, washed with water, dried and dissolved in methylene chloride. Filtration of this solution through "Woelm" activity III, neutral alumina, concentration of the eluate, and addition of hexane yielded the crude product, which was further chromatographed over "Woelm" activity III, neutral alumina and then crystallized from methylene chloride/hexane, aqueous ethanol and finally from ethanol yielding 7-nitro-5-phenyl-3H-1,4-benzodiazepine-2(1H)-thione as orange prisms melting at 209°–214°.

The above-mentioned 7-nitro-5-phenyl-3H-1,4-benzodiazepin-2(1H)-one, its preparation and intermediates therefor, are not a part of the instant invention, but such are disclosed hereinbelow in order that the present disclosure may be complete.

Forty-eight g. of 5-phenyl-3H-1,4-benzodiazepin-2(1H)-one was dissolved in 250 cc. of concentrated sulfuric acid by stirring at 15° for one-half hour. The solution was then cooled to 0° and a mixture of 9.1 cc. of fuming nitric acid (90 percent – sp. gr. 1.50) and 11.8 cc. of concentrated sulfuric acid was added dropwise with stirring, keeping the temperature of the reaction mixture between –5° and 0°. After completion of the addition of the nitric acid-sulfuric acid mixture, stirring was continued for 1 hour and the reaction mixture was stored in the refrigerator overnight.

The mixture was then added dropwise to 2 kg. of crushed ice with stirring and cooling, keeping the temperature at 0°. After 1 hour of stirring in the cold, 640 cc. of concentrated ammonium hydroxide was added dropwise at 0° to pH 8. Stirring was continued for one-half hour and the crude product was filtered off, washed with a small amount of ice water and sucked dry overnight. The crude product was suspended in a mixture of 100 cc. of methylene chloride and 1,700 cc. of alcohol. 50 g. of decolorizing charcoal was added and the mixture was refluxed with stirring for 2 hours. After standing overnight at room temperature 15 g. of diatomaceous earth filter aid was added and the refluxing was resumed for 1½ hours. The mixture was filtered while hot. The clear, light yellow filtrate was concentrated in vacuo on the steam bath with stirring to about 600 cc. The concentrate was stirred and cooled in ice for about 2 hours; the precipitated crystalline product was filtered off, washed with some petroleum ether and sucked dry. The product, 7-nitro-5-phenyl-3H-1,4-benzodiazepin-2(1H)-one, was recrystallized from a mixture of 1000 cc. of alcohol and 50 cc. of methylene chloride to obtain white prisms melting at 224°–225°.

EXAMPLE 6

1.0 mole of 7-dimethylamino-5-phenyl-3H-1,4-benzodiazepin-2-(1H)-one was treated with phosphorus pentasulfide according to the procedure described in example 4 above, yielding, upon addition of the petroleum ether, a brown gum which was dissolved in benzene. The resulting solution was then extracted with dilute aqueous sodium hydroxide and the extract was acidified with dilute hydrochloric acid and then neutralized to pH 7 by addition of sodium bicarbonate solution. The resulting precipitate was extracted with methylene chloride, and the extract was washed with water, dried over magnesium sulfate and evaporated. Recrystallization of the resulting residue from methylene chloride/petroleum ether, benzene and finally ethanol, yielded 7-dimethylamino-5-phenyl-3H-1,4-benzodiazepine-2(1H)-thione as bright yellow prisms melting at 250°–253°.

The above-mentioned 7-dimethylamino-5-phenyl-3H-1,4-benzodiazepin-2(1H)-one, its preparation and intermediates therefor, are not a part of the instant invention, but such are disclosed hereinbelow in order that the present disclosure may be complete.

To a solution of 56 g. of 7-nitro-5-phenyl-3H-1,4-benzodiazepin-2(1H)-one in 800 ml. of methanol was added 80 ml. of a 37 percent aqueous solution of formaldehyde and ca. 8 g. of Raney nickel. This mixture was shaken for 22 hours and ca. twenty atm of hydrogen pressure. The solution was filtered from the catalyst and concentrated yielding yellow needles of 7-dimethylamino-5-phenyl-3H-1,4-benzodiazepin-2(1H)-one, which upon recrystallization from ethyl acetate gave crystals melting at 245°–247°.

EXAMPLE 7

1.0 mole of 7-methylmercapto-5-phenyl-3H-1,4-benzodiazepin-2(1H)-one was treated with phosphorus pentasulfide according to the method described in example 4 above, yielding, upon the addition to the ice-cooled aqueous sodium chloride solution, crude solid product which was filtered off, washed well with water, and dried at 80° in vacuo. The residue of reddish-colored prisms was then dissolved in methylene chloride and chromatographed on a short column of "Woelm" activity III, neutral alumina. The eluates were concentrated and then diluted with petroleum ether giving precipitated product which was further chromatographed on "Woelm" activity III, neutral alumina and then crystallized from ethanol yielding 7-methyl-mercapto-5-phenyl-3H-1,4-benzodiazepine-2(1H)-thione as orange needles melting at 222°–224°.

The above-mentioned 7-methylmercapto-5-phenyl-3H-1,4-benzodiazepin-2(1H)-one, its preparation and intermediates therefor, are not a part of the instant invention, but such are disclosed hereinbelow in order that the present disclosure may be complete.

Thirty g. of 2-aminobenzophenone and 40 g. of sodium thiocyanate were suspended in 100 cc. of methanol. After cooling to 0°, a cold solution of 9.5 cc. of bromine (28.5 g.) dissolved in 35 cc. cold methanol (saturated with sodium bromide) was added dropwise. After completing the addition, the reaction mixture was stirred in the cold for an additional one-half hour and poured into 1 liter of cold water. After neutralization with 110 cc. of 20% $Na_2CO_3$, the product, 2-amino-5-thiocyanobenzophenone, was filtered off and crystallized from dilute ethanol in yellow plates, m.p. 83°–84°.

Thirty-nine g. of 2-amino-5-thiocyanobenzophenone were suspended in 200 cc. of ethanol. The mixture was heated to 50° on the steam bath and a total of 55 g. of sodium hydrosulfite and 250 cc. of 10% NaOH were added alternately in portions. The temperature was raised to 80°. At this point the reaction mixture gave a blue coloration with indanthrene yellow paper, indicating the presence of an excess of $Na_2S_2O_4$.

After cooling to 40°, 20 cc. (27 g.) of dimethylsulfate were added dropwise. A negative reaction with lead acetate at this point indicated the absence of free mercaptan. It was stirred for 1 hour at room temperature and then ethanol was distilled off. The aqueous phase was diluted with 700 cc. of water and the oily thioether was extracted with four 300 cc. portions of benzene. The benzene phase was dried and the solvent removed by vacuum distillation. The crude reaction product, 2-amino-5-methylmercaptobenzophenone, remained as a heavy oil.

Forty-two g. of 2-amino-5-methylmercaptobenzophenone were heated with 40 g. of glycine ethyl ester hydrochloride in 75 cc. of pyridine at 118°–120° for 6 hours, distilling off the pyridine slowly and replacing it as needed. At the end of the heating period, the mixture was concentrated in vacuo and the residue was partitioned between 500 cc. of benzene and 200 cc. of water. The desired product was precipitated from the benzene phase by the addition of Skellysolve B and filtered off. The product, 7-methylmercapto-5-phenyl-3H-1,4-benzodiazepin-2(1H)-one, crystallized from acetone in yellow needles melting at 216°–218°.

EXAMPLE 8

1.0 mole of 7-chloro-5-(2-fluorophenyl)-3H-1,4-benzodizaepin-2(1H)-one was treated with phosphorus pentasulfide according to the method described in example 4 above, yielding, upon the addition of the petroleum ether, orange - brown prisms which were crystallized from benzene/hexane and then from ethanol, yielding 7-chloro-5-(2-fluorophenyl)-3H-1,4-benzodiazepine-2(1H)-thione as pale yellow prisms melting at 229°–232°.

The above-mentioned 7-chloro-5-(2-fluorophenyl)-3H-1,4-benzodiazepin-2(1H)-one, its preparation and intermediates therefor, are not a part of the instant invention, but such are disclosed hereinbelow in order that the present disclosure may be complete.

A mixture of 176 g. of o-fluoro benzoyl chloride and 64 g. of p-chloroaniline was stirred and heated to 180°, at which temperature 87 g. of zinc chloride was introduced, the temperature raised to 200°–205° and maintained there for forty minutes. The golden colored melt was quenched by the careful addition of 500 ml. of 3 N hydrochloric acid and the resulting mixture refluxed for 5 minutes. The acid solution was decanted and the process repeated three times to remove all o-fluorobenzoic acid. The grey granular residue was dissolved in 300 ml. of 75 percent (vol./vol.) sulphuric acid and refluxed for forty minutes to complete hydrolysis. The hot solution was poured over 1 kg. of ice and diluted to two liters with water. The organic material was extracted with four 300 ml. portions of methylene chloride which were subsequently washed with two 500 ml. portions of 3 N hydrochloric acid to remove traces of p-chloroaniline, three 500 ml. portions of 5 N sodium hydroxide solution to remove o-fluorobenzoic acid, and finally two 200 ml. portions of saturated brine solution. The methylene chloride extract was dried over anhydrous sodium sulphate and the solvent removed to give the crude aminobenzophenone. Recrystallization from methanol gave 2-amino-5-chloro-2'-fluorobenzophenone as yellow needles, (m.p. 94°–95°).

A mixture of 20 g. of 2-amino-5-chloro-2'-fluorobenzophenone and 35 g. of glycine ethyl ester hydrochloride was refluxed in 200 ml. of pyridine, containing 0.5 ml. of piperidine, for 18 hours. The mixture was distilled until 100 ml. of pyridine had been collected, and the residue poured into water. The remaining pyridine was neutralized with dilute hydrochloric acid and the product extracted with two 100 ml. portions of methylene chloride. The extracts were combined, washed well with water and saturated brine solution, dried over anhydrous sodium sulfate, and the solvent removed under reduced pressure. The oil remaining was dissolved in acetone, treated with charcoal (Norite), filtered and recrystallized from a mixture of acetone and hexane to give 7-chloro-5-(2-fluorophenyl)-3H-1,4-benzodiazepin-2(1H)-one as white needles m.p. 205°–206°.

EXAMPLE 9

1.0 mole of 7-bromo-5-phenyl-3H-1,4-benzodiazepin-2(1H)-one was treated with phosphorus pentasulfide according to the method described in example 7 above, yielding upon the addition of petroleum ether, a brown crystalline residue which was treated with boiling benzene. The undissolved residue was crystallized from aqueous ethanol and then from ethanol, yielding 7-bromo-5-phenyl-3H-1,4-benzodiazepine-2(1H)-thione, as orange - yellow prisms melting at 255°–256°.

The above-mentioned 7-bromo-5-phenyl-3H-1,4-benzodiazepin-2(1H)-one, its preparation and intermediates therefor, are not a part of the instant invention, but such are disclosed hereinbelow in order that the present disclosure may be complete.

A mixture of 27.6 g. of 2-amino-5-bromobenzophenone, 21 g. of glycine ethyl ester hydrochloride and 300 ml. of pyridine was refluxed. After one hour, 21 ml. of pyridine was distilled off and then an additional 21 g. of glycine ethyl ester hydrochloride was added. The reaction mixture was then refluxed for 15 hours, concentrated partly at atmospheric pressure and then in vacuo. Ether and water were added to the residue and the crude crystalline 7-bromo-5-phenyl-3H-1,4-benzodiazipin-2(1H)-one was filtered off. After recrystallization from acetone, the product formed colorless prisms melting at 220°–221°.

EXAMPLE 10

1.0 mole of 7-methyl-5-phenyl-3H-1,4-benzodiazepin-2(1H)-one was treated with phosphorus pentasulfide according to the method described in example 7 above, yielding, upon the addition of petroleum ether, brown crystals which were crystallized from methylene chloride/petroleum ether and then from ethanol, yielding 7-methyl-5-phenyl-3H-1,4-benzodiazepine-2(1H)-thione as cream-colored prisms melting at 260°–261°.

EXAMPLE 11

1.0 mole of 7-chloro-5-(2-chlorophenyl)-1-methyl-3H-1,4-benzodiazepin-2(1H)-one in anhydrous pyridine (2 l., freshly distilled from barium oxide) was treated with 242 g. of phosphorus pentasulfide and the mixture stirred and refluxed for 1 hour, with protection from atmospheric moisture. The pyridine solution was evaporated in vacuo and the residue mixed with 500 ml. of toluene, which was likewise distilled off in vacuo to remove the remaining pyridine by co-distillation. The residue was then extracted with cold methylene chloride, and the remaining mixture added portionwise to a mixture of ice and ice-water. The mixture was extracted with methylene chloride and the combined methylene chloride extracts from both extractions were washed with water, dried over anhydrous magnesium sulfate, and filtered through a short chromatography column containing "Woelm" neutral alumina, activity III. Concentration of the eluates and addition of petroleum ether yielded the crude crystalline product which was recrystallized from benzene/hexane yielding 7-chloro-5-(2-chloro-phenyl)-1-methyl-3H-1,4-benzodiazepine-2(1H)-thione as pale yellow prisms melting at 160°–163°.

The above-mentioned 7-chloro-5-(2-chlorophenyl)-1-methyl-3H-1,4-benzodiazepin-2(1H)-one, its preparation and intermediates therefor, are not a part of the instant invention, but such are disclosed hereinbelow in order that the present disclosure may be complete.

2-Amino-2'-5-dichlorobenzophenone (112 g.) was dissolved in a solution containing glycine ethyl ester hydrochloride (180 g.) in pyridine (500 ml.) and piperidine (5 ml.). After refluxing for 18 hours, the solvents were evaporated, the residue taken up in ether and the ether extract washed with water. The ether phase was repeatedly extracted with 2 N HCl thus separating the salt of the reaction product from the unreacted ketone which remains in the ether. The acidic aqueous solution was neutralized and extracted with ether to yield 7-chloro-5-(2-chlorophenyl)-3H-1,4-benzodiazepin-2(1H)-one. After recrystallization from methanol the product forms crystals melting at 199°–201°.

7-Chloro-5-(2-chlorophenyl)-3H-1,4-benzodiazepin-2(1H)-one (15.2 g.) was dissolved in methanol (250 ml.) and a 1 N solution of sodium methoxide (50 ml.) added. The solvent was removed in vacuo; the residue dissolved in dimethylformamide (50 ml.) and methyliodide (10 ml.) added. In a spontaneous reaction the temperature of the solution rose to 50°. After 30 minutes the main amount of the solvent was evaporated in vacuo, the residue poured into water and extracted with ether. From this ether solution crystals were isolated which after recrystallization from methanol yielded 1-methyl-7-chloro-5-(2-chlorophenyl)-3H-1,4-benzodiazepin-2(1H)-one, m.p. 135°–138°.

EXAMPLE 12

1.0 mole of 1-methyl-5-(2-trifluoromethylphenyl)-3H-1,4-benzodiazepin-2(1H)-one was treated with phosphorus pentasulfide according to the method described in example 11, whereby, upon the addition of petroleum ether, there was obtained crude product as pale yellow prisms which were crystallized from aqueous ethanol and then from ethanol, yielding 1-methyl-5-(2-trifluoromethylphenyl)-3H-1,4-benzodiazepine-2(1H)-thione as cream-colored prisms melting at 133°–136°.

The above-mentioned 1-methyl-5-(2-trifluoromethylphenyl)-3H-1,4-benzodiazepin-2(1H)-one, its preparation and intermediates therefor, are not a part of the instant invention, but such are disclosed hereinbelow in order that the present disclosure may be complete.

A solution of o-trifluoromethylphenyl magnesium bromide was prepared in the usual manner from 50.0 g. of o-bromobenzotrifluoride, 5.55 g. of magnesium and 110 ml. of anhydrous ether. The Grignard reagent can also be prepared by reacting 39.7 g. of o-chlorobenzotrifluoride with 5.55 g. of magnesium in tetrahydrofuran. This solution was added with stirring at 20° over a period of 3 hours to a solution of 33.0 g. of 2-methyl-4H-3,1-benzoxazin-4-one in 300 ml. of methylene chloride. The resulting dark but clear solution was left at room temperature for 16 hours and was then poured over a mixture of 50 g. of ammonium chloride and 600 g. of crushed ice. Extraction with ether gave a crude reaction product which was directly hydrolyzed by refluxing for one hour in a mixture of 240 ml. of ethanol and 240 ml. of 3N sodium hydroxide. After standing overnight, the reaction mixture was extracted with ether. The ether layer was washed with water and concentrated in vacuo yielding an oil. This was purified in two portions by chromatography on the 20-fold amount of neutral alumina (activity grade III; e.g., containing 6% of water). Elution with petroleum ether (60°–70°) and a mixture of petroleum ether (60°–70°) and ether (9:1) followed by crystallization from a mixture of ether and hexane yielded 2-amino-2'-trifluoromethylbenzo-phenone, melting at 94°–96° (yellow prisms).

To a solution of 5.0 g. of 2-amino-2'-trifluoromethylbenzophenone in 25 ml. of anhydrous ether, cooled to 0°, 1.7 ml. of bromoacetylbromide was added with stirring; a precipitation occurred and the yellow color of the solution gradually faded. The suspension containing 2-bromoacetamido-2'-tri-fluoromethylbenzophenone (not isolated) was stirred for half an hour at 0° and for 2 hours at room temperature. After that, 25 ml. of liquid ammonia was condensed into the flask, by introducing ammonia gas and using an efficient dry ice-acetone condenser. The resulting mixture was stirred and refluxed (b.p. of liquid ammonia) for 3 hours. After taking off the condenser, the ammonia was allowed to evaporate overnight. The reaction mixture was extracted with ether (the ether layers being washed 3 times with water) and yielded crude 2-amino-2'-(2-trifluoromethylbenzoyl)acetanilide. Recrystallization from a mixture of 15 ml. of benzene and 15 ml. of hexane gave the pure product, melting at 141°–142° (colorless, rhombic plates).

3.0 g. of 2-amino-2'-(2-trifluoromethylbenzoyl)acetanilide was heated in an open tube for 15 minutes to 200°–205°, using an oil bath. Water was given off. On cooling, a brown glass was obtained which, on crystallization from a mixture of methanol and ether, gave crude 5-(2-trifluoromethylphenyl)-3H-1,4-benzodiazepin-2(1H)-one. The mother liquor was evaporated to dryness, dissolved in benzene and chromatographed on 60 g. of neutral alumina (activity grade III, e.g., containing 6 percent of water). Elution with benzene (300 ml.) gave a product which could be crystallized to give some starting material. Then, with a benzene-ether-(1:1)-mixture (400 ml.), a crude product could be eluted. This, on crystallization from ether-hexane, gave the pure 5-(2-trifluoromethylphenyl)-3H-1,4-benzodiazepin-2(1H)-one, melting at 187°–188° (almost colorless prisms).

5-(2Trifluoromethylphenyl)-3H-1,4-benzodiazepin-2(1H)-one (60.8 g.) was added at 20° to a solution of sodium methoxide, prepared from sodium (5.06 g.) and anhydrous methanol (500 ml.). The mixture was stirred for 15 minutes at room temperature, during which time all the solids dissolved. Methyl iodide (40 ml.) was then added dropwise to the stirred solution during 20 minutes and stirring was continued for a further 3 hours at room temperature. The solution was concentrated in vacuo at 25° and water (900 ml.) added to the residue. The mixture containing the resulting precipitate was extracted with methylene chloride. The extract was washed with water, dried over anhydrous magnesium sulfate and evaporated, to give the crude product as a green gum which rapidly crystallized. Recrystallization from ethanol-water, with addition of decolorizing carbon, gave blue crystals. Decolorization of the product was readily effected by dissolving it in methylene chloride and filtering the resulting solution through a short column of "Woelm" neutral alumina, activity V (400 g.). Evaporation of the eluates and recrystallization of the resulting residue from aqueous ethanol, with addition of decolorizing carbon, gave 1-methyl-5-(2-trifluoromethylphenyl)-3H-1,4-benzodiazepin-2(1H)-one as very pale yellow crystals, melting at 137°–138°. Further crops obtained from the mother-liquors were purified by the above method and upon recrystallization from aqueous ethanol yielded colorless rhombs, melting at 135°–137°.

EXAMPLE 13

1.0 mole of 7-dimethylamino-1-methyl-5-phenyl-3H-1,4-benzodiazepin-2(1H)-one was treated with phosphorus pentasulfide according to the method described in example 11, whereby, upon the addition of petroleum ether, there was obtained a crude product which was recrystallized from aqueous ethanol and then from ethanol, yielding 7-dimethylamino-1-methyl-5-phenyl-3H-1,4-benzodiazepine-2(1H)-thione as yellow prisms melting at 185°–187°.

The above-mentioned 7-dimethylamino-1-methyl-5-phenyl-3H-1,4-benzodiazepin-2(1H)-one, its preparation and intermediates therefor, are not a part of the instant invention, but such are disclosed hereinbelow in order that the present disclosure may be complete.

5.6 g. of 7-nitro-5-phenyl-3H-1,4-benzodiazepin-2(1H)-one was suspended in 75 cc. of methanol. 1.1 g. of sodium methylate was added with stirring. The clear yellow-brown solution was concentrated to dryness in vacuo giving the yellow sodio derivative. This sodio derivative was dissolved in 70 cc. of dimethylformamide. 3.8 cc. (8.52 g.) of methyl iodide was added dropwise, the temperature rising at 30°. The reaction mixture was cooled and stirred for 1½ hours. The clear brown solution was added to about 500 cc. of ice and water with stirring. The fine yellow precipitate was filtered off, washed with ice water, sucked dry and dried in vacuo of 50° over sodium hydroxide. The pure 1-methyl-7-nitro-5-phenyl-3H-1,4-benzodiazepin-2(1H)-one crystallized in needles from dilute ethanol and melted at 156°–157°.

To a solution of 25 g. of 1-methyl-7-nitro-5-phenyl-3H-1,4-benzodiazepin-2(1H)-one in 600 ml. of methanol was added 50 ml. of a 37 percent solution of aqueous formaldehyde and ca. 8 g. of Raney nickel. This mixture was shaken under an initial pressure of 8 atm hydrogen. After 2 to 3 hours the theoretical amount (5 moles of hydrogen per mole of substance) had been taken up and the pressure remained constant. The solution was filtered from the catalyst and the main amount of methanol was removed in vacuo. Yellow prisms of 7-dimethylamino-1-methyl-5-phenyl-3H-1,4-benzodiazepin-2(1H)-one separated which after recrystallization from a mixture of ethanol, ether and hexane melted at 141°–143°.

EXAMPLE 14

A solution of 6.0 g. of 5-(4-chlorophenyl)-1-methyl-3H-1,4-benzodiazepin-2(1H)-one in 45 ml. of dry pyridine was treated with 5.1 g. of phosphorus pentasulfide and refluxed for 1 hour. The pyridine was then removed by distillation, the last traces being co-distilled with added toluene. One-hundred ml. of ice-water was then added to the mixture and the product extracted into methylene chloride (3 × 50 ml.). The organic layers were combined, washed with water, (2 × 50 ml.), dried over anhydrous sodium sulfate, filtered over 50 g. of "Woelm" activity I, neutral alumina and concentrated. The crystalline residue was recrystallized from methanol yielding 5-(4-chlorophenyl)-1-methyl-3H-1,4-benzodiazepine-2(1H)-thione as pale yellow rods melting at 181°–182°.

The above mentioned 5-(4-chlorophenyl)-1-methyl-3H-1,4-benzodiazepin-2(1H)-one, its preparation and intermediates therefor, are not a part of the instant invention, but such are disclosed hereinbelow in order that the present disclosure may be complete.

137 g. of anthranilic acid was dissolved in 250 cc. dimethylformamide. The solution was cooled to 0° and 85 cc. (155 g.) of thionyl chloride was added dropwise, keeping the temperature of the reaction mixture below 40°. After allowing the mixture to cool to room temperature, 750 cc. of acetone was added. It was then cooled to 0°. The white 2-dimethylformamidinoanthranilic acid hydrochloride which separated was filtered off, washed with 300 cc. of cold acetone and sucked dry.

To a stirred suspension of 58 g. of 2-dimethylformamidinoanthranilic acid hydrochloride in 750 cc. of chlorobenzene was added in portions 60 g. of phosphorus pentachloride. The mixture was heated on the steam bath for 2 hours and cooled in ice to 10°. 135 g. of aluminum chloride was added in 4 portions, keeping the temperature of the reaction mixture below 10°. After completion of the addition of the aluminum chloride, the mixture was heated on the steam bath for 3 hours at 95°.

The reaction mixture was cooled in ice and 400 g. of crushed ice was added in portions, keeping the temperature below 40°. Next, 500 cc. of 40 percent sodium hydroxide was added dropwise, again keeping the temperature of the reaction mixture below 40°. The pH at this point was about 11. Heating on the steam bath at 95° for 4 hours followed, then cooling at 40°. The mixture was transferred to a separatory funnel and the chlorobenzene phase was separated. The aqueous phase was extracted with three 100 cc. portions of chlorobenzene and the combined chlorobenzene phases were concentrated in vacuo on the steam bath, yielding an oily residue. The oil was refluxed with stirring in a mixture of 150 cc. of ethanol, 75 cc. of water and 75 cc. of 10 percent sodium hydroxide for 24 hours. The solvents were distilled off at atmospheric pressure, the mixture was cooled and 500 cc. of water was added dropwise with stirring. After standing in the refrigerator overnight, the solid yellow product, 2-amino-4'-chlorobenzophenone, was filtered off, sucked dry, dried in vacuo at room temperature over sodium hydroxide, then crystallized from 200 cc. of hot ethanol in the form of yellow needles, m.p. 98°–99°.

A stirring mixture of 15.5 g. of 2-amino-4'-chlorobenzophenone, 35 cc. of pyridine and 15 g. of glycine ethyl ester hydrochloride was slowly distilled at 115°–120°, with the pyridine being replaced dropwise to keep the volume unchanged. After 5 hours, the reaction mixture was concentrated to dryness in vacuo. The residue was heated on the steam bath with 50 cc. of benzene and 50 cc. of water. The extract was decanted and the residue was re-extracted with 50 cc. of benzene and 50 cc. of water. The insoluble brown precipitate was filtered off and sucked dry. The crude product, 5-(p-chlorophenyl)-3H-1,4-benzodiazepin-2(1H)-one, was recrystallized twice from ethanol to obtain white plates melting at 262°–263°.

To a solution of 15 g. of 5-(4-chlorophenyl)-3H-1,4-benzodiazepin-2(1H)-one in 45 ml. of N,N-dimethylformamide, a solution of 1.2 g. of sodium in 12 ml. of methanol was added and the mixture stirred for 30 minutes at room temperature. The solution of the sodio derivative was cooled to −5° and 34.5 g. of methyl iodide added dropwise over 10 minutes, keeping the temperature at between −3° and 0°. Stirring was continued for 10 minutes at 0° and then at room temperature for 1 hour. The mixture was poured into 1 l. of water, and the mixture was extracted with methylene chloride (3 × 150 ml.). The organic extracts were combined, washed with water (3 × 200 ml.), dried over anhydrous sodium sulfate, and filtered over a small column of alumina, neutral grade I. The solvent was then evaporated and the residue crystallized from methanol, yielding 5-(4-chlorophenyl)-1-methyl-3H-1,4-benzodiazepin-2(1H)-one as white prisms melting at 160°–162°.

EXAMPLE 15

A mixture of 1.4 g. of 7-methyl-5(2-chlorophenyl)-3H-1,4-benzodiazepin-2(1H)-one, 1.35 g. of phosphorus pentasulfide and 20 ml. of pyridine was heated for 0.75 hours under reflux. The dark-colored reaction solution was freed of pyridine in vacuo, and the residue was dissolved in about 40 ml. of chloroform. This solution was filtered through aluminum oxide, activity III whereby some of the dark-colored impurities were removed. The still dark yellow solution was evaporated in vacuo to dryness, yielding a brown crystalline product from which the dark-colored impurities could for the most part be removed by extraction with methanol/ether. The residual yellow crystals were recrystallized from methylene chloride/ethanol yielding 7-methyl-5-(2-chlorophenyl)-3H-1,4-benzo-diazepine-2(1H)-thione melting at 245°–247°.

The above-mentioned 7-methyl-5-(2-chlorophenyl)-3H-1,4-benzodiazepin-2(1H)-one, its preparation and intermediates therefor, are not a part of the instant invention, but such are disclosed hereinbelow in order that the present disclosure may be complete. Thirty-nine g. of o-chlorobenzoyl chloride was warmed to 110°. With stirring 10.7 g. of p-toluidine was added and the mixture heated to 180°. Then 20 g. of anhydrous zinc chloride was added and the temperature raised to 220° during 1 hour. After cooling to 130°, 200 ml. of water was added and the mixture heated to reflux for 5 minutes with vigorous stirring. The hot water layer was then decanted and the procedure was repeated 3 times.

The water-insoluble residue was then refluxed for 10 hours with a mixture of 25 ml. of water, 35 ml. of acetic acid and 50 ml. of concentrated sulfuric acid. The resulting dark solution was cooled, poured into ice-water and the mixture extracted with ether. The ether solution was shaken with 2N sodium hydroxide. Concentration of the dark ether solution yielded 5- methyl-2-amino-2'-chlorobenzophenone as a yellow oil which after three crystallizations from hexane melted at 106°–107°.

A mixture of 30 g. of 5-methyl-2-amino-2'-chlorobenzophenone, 200 ml. of pyridine, 3 ml. of piperidine and 50 g. of glycine ethyl ester hydrochloride was heated to reflux for 17 hours. The solvent was then evaporated in vacuo and the residue treated with water and extracted with ether. The ether extract was dried with sodium sulfate and concentrated to yield a yellow oil which was chromatographed on 700 g. of neutral aluminum oxide, activity III. A first elution was performed with benzene-petroleum ether (1:1). Further elution with ether yielded white crystals of 7-methyl-5-(2-chlorophenyl)-3H-1,4-benzodiazepin-2(1H)-one, which after several recrystallizations from methanol, melted at 223°–224°.

EXAMPLE 16

25.0 g. of 7-chloro-2-methylmercapto-5-phenyl-3H-1,4-benzodiazepine was dissolved in a mixture of 300 ml. of ethanol and 50 ml. of dimethylsulfoxide. The solution was heated under reflux on a steam bath, and gaseous monomethylamine was passed through the mixture at a slow rate. The reaction was continued until evolution of methylmercaptan ceased. The solution was then concentrated in vacuo to remove the more volatile solvents, the residue was dissolved in aqueous 1N hydrochloric acid, and then extracted with ether. The aqueous acid layer was then made basic with dilute sodium hydroxide solution, with cooling, and the resulting precipitate was extracted with methylene chloride. The extract was washed with water, dried over anhydrous magnesium sulfate and evaporated, yielding the crude product as pale yellow crystals. Recrystallization from acetone yielded colorless prisms of 7-chloro-2-methylamino-5-phenyl-3H-1,4-benzodiazepine melting at 238°–240°.

EXAMPLE 17

28.7 g. of 7-chloro-5-phenyl-3H-1,4-benzodiazepine-2(1H)-thione was dissolved in a mixture of 250 ml. of methanol and 50 ml. of dimethylsulfoxide, and the so-obtained mixture was then treated with 0.2 mole of piperidine. The homogeneous solution was then refluxed on the steambath until evolution of hydrogen sulfide ceased and the solution was then concentrated in vacuo to remove the more volatile solvents, diluted with water, and acidified with dilute hydrochloric acid. The mixture was then extracted with ether and then the aqueous acid layer (together with undissolved product) was made basic with dilute sodium hydroxide solution, with cooling. The product was extracted with methylene chloride, the extract washed with water, dried over anhydrous magnesium sulfate and evaporated, yielding the crude product as an oil, which upon several crystallizations from aqueous ethanol formed colorless prisms of 7-chloro-5-phenyl-2-piperidino-3H-1,4-benzodiazepine melting at 115°–116°.

EXAMPLE 18

3.01 g. of 7-chloro-2-methylmercapto-5-phenyl-3H-1,4-benzodiazepine was treated with 0.25 mole of liquid piperidine and the mixture then refluxed until evolution of methylmercaptan ceased. The excess amine was evaporated off in vacuo, the residue mixed with water and extracted with ether. The aqueous acid layer (together with undissolved product) was worked up as described in example 17, giving the crude product as an oil, which upon several crystallizations from ethanol formed colorless prisms of 7-chloro-2-piperidino-5-phenyl-3H-1,4-benzodiazepine melting at 115°–116°, undepressed on mixed melting point with a sample of the compound prepared according to the procedure of example 17 above.

EXAMPLE 19

7-Chloro-5-phenyl-3H-1,4-benzodiazepine-2(1H)-thione was reacted with n-hexylamine according to the method described in example 17 above, yielding the crude product as an oil. Upon several recrystallizations from aqueous ethanol, it formed cream-colored prisms of 7-chloro-2-n-hexylamino-5-phenyl-3H-1,4-benzodiazepine melting at 149°–150°.

EXAMPLE 20

7-Chloro-2-methylmercapto-5-phenyl-3H-1,4-benzodiazepine was reacted with n-hexylamine according to the method described in example 18 above, yielding the crude product as orange crystals which upon crystallization from aqueous ethanol formed cream-colored prisms of 7-chloro-2-n-hexylamino-5-phenyl-3H-1,4-benzodiazepine melting at 149°–150°, undepressed on mixed melting point with a sample of the compound prepared according to the procedure of example 19 above.

EXAMPLE 21

7-Chloro-2-methylmercapto-5-phenyl-3H-1,4-benzodiazepine was reacted with dimethylamine according to the procedure described in example 16 above, yielding the crude product as orange crystals which upon crystallization from ethanol formed pale yellow prisms of 7-chloro-2-dimethylamino-5-phenyl-3H-1,4-benzodiazepine melting at 176°–177°.

EXAMPLE 22

7-Chloro-5-phenyl-3H-1,4-benzodiazepine-2(1H)-thione was reacted with n-butylamine according to the method described in example 17 above, yielding the crude product as tan-colored crystals which upon crystallization from aqueous methanol formed colorless prisms of 7-chloro-2-n-butylamino-5-phenyl-3H-1,4-benzodiazepine melting at 167°–169°.

EXAMPLE 23

7-Chloro-2-methylmercapto-5-phenyl-3H-1,4-benzodiazepine was reacted with n-butylamine according to the procedure described in example 18 above, yielding the crude product as colorless crystals which upon crystallization from aqueous ethanol formed colorless prisms of 7-chloro-2-n-butylamino-5-phenyl-3H-1,4-benzodiazepine melting at 166°–168°, undepressed on mixed melting point with a sample of the compound prepared according to the procedure of example 22 above.

EXAMPLE 24

7-Chloro-5-phenyl-3H-1,4-benzodiazepine-2(1H)-thione was refluxed with 2-diethylaminoethylamine according to the procedure described in example 17 above, yielding the crude product as an oil. This oily material was dissolved in methylene chloride and the resulting methylene chloride solution was chromatographed over a column of "Woelm" neutral alumina, activity III. Crystallization of the purified material from petroleum ether, and further recrystallization from pentane yielded colorless prisms of 7-chloro-2-(β-diethylaminoethylamino)-5-phenyl-3H-1,4-benzodiazepine melting at 105°–107°. The so-obtained product was dissolved in the minimum quantity of methanol, and then 1.1 equivalents of methanolic 2N hydrochloric acid was added thereto. The resulting mixture was diluted with ether and petroleum ether, yielding a precipitate which upon crystallization from ethanol/ether formed pale yellow prisms of 7-chloro-2-(β-diethylaminoethylamino)-5-phenyl-3H-1,4-benzodiazepine monohydrochloride melting at 252°–254°. The dihydrochloride was prepared by dissolving the base in the minimum quantity of methanol, followed by the addition of 2N hydrochloric acid (2.2 equivalents) and precipitation of the hydrochloride by dilution of the solution of ether. Recrystallization of the residue from isopropanol yielded the dihydrochloride as yellow prisms melting at 249°–250°.

EXAMPLE 25

28.7 g. of 7-chloro-5-phenyl-3H-1,4-benzodiazepine-2(1H)-thione was suspended in 500 ml. of toluene, and then treated with 26.0 g. of β-morpholinoethylamine. The mixture was stirred and refluxed until evolution of hydrogen sulfide ceased, and then it was cooled and extracted with aqueous 1N hydrochloric acid. The extract was rendered alkaline via addition, with cooling, of 3N sodium hydroxide solution, and the product was extracted with methylene chloride, and the extract washed with water, dried over anhydrous sodium sulfate, and evaporated. The residual crude product was dissolved in benzene, and the resultant benzene solution was chromatographed over "Woelm" activity III, neutral alumina. Evaporation of the eluates, followed by crystallization from methylene chloride/pentane, yielded colorless prisms of 7-chloro-2-(β-morpholinoethylamino)-5-phenyl-3H-1,4-benzodiazepine melting at 196°–198°.

EXAMPLE 26

7-Chloro-5-phenyl-3H-1,4-benzodiazepine-2(1H)-thione was reacted with β-phenylethylamine according to the procedure described in example 17 above, yielding the crude product as an oil which, upon crystallization from aqueous ethanol, gave pale tan-colored prisms of 7-chloro-2-phenethylamino-5-phenyl-3H-1,4-benzodiazepine melting at 137°–138°.

EXAMPLE 27

12.6 g. of 7-chloro-5-(2-methoxyphenyl)-3H-1,4-benzodiazepin-2(1H)-one was mixed with 80 ml. of anhydrous pyridine and 9.23 g. of phosphorus pentasulfide. The mixture was stirred and refluxed for 45 minutes, with protection from atmospheric moisture, during which time the solids rapidly dissolved. At the end of this time the mixture was cooled rapidly in an ice-bath, and then the pyridine solution of products was added dropwise to a well-stirred saturated aqueous sodium chloride solution (500 ml.), cooled to 0°–10° in an ice-bath. The product precipitated as an oil, which was isolated by extraction with methylene chloride (500 ml., 2 × 200 ml.). The extract was washed with water, dried over magnesium sulfate, and filtered through a short chromatography column containing "Woelm" neutral alumina, activity III to remove most of the colored impurities. The methylene chloride eluates were concentrated to about 100–150 ml., followed by dilution with petroleum ether (40°–60°; 500 ml.), to give the crude product as tan-colored prisms which upon recrystallization from benzene and then from ethanol yielded 7-chloro-5-(2-methoxyphenyl)-3H-1,4-benzodiazepine-2(1H)-thione as yellow needle-like prisms, melting at 222°–224°.

The above-mentioned 7-chloro-5-(2-methoxyphenyl)-3H-1,4-benzodiazepin-2(1H)-one, its preparation and intermediates therefor, are not a part of the instant invention, but such are disclosed hereinbelow in order that the present disclosure may be complete.

A Grignard reagent prepared from 10.3 g. of o-bromanisole and 1.3 g. of magnesium in 100 cc. of ether was added slowly to an ice cold solution of 9.8 g. of 6-chloro-2-methyl-3,1-4H-benzoxazine-4-one in 150 cc. of benzene and 50 cc. of ether. A yellow precipitate formed. The reaction mixture was stirred for 1 hour in an ice bath and for 1 hour at room temperature. It was then chilled in an ice-salt bath and decomposed by the careful addition of 100 cc. of cold 2N hydrochloric acid. The mother liquor was taken to dryness in vacuo and the residue crystallized from hexane to give 2-acetamino-5-chloro-2'-methoxybenzophenone, which after recrystallization from hexane was found to melt at 124°–126°.

A solution of 3.9 g. of 2-acetamino-5-chloro-2'-methoxybenzophenone in 100 cc. of ethanol and 50 cc. of 6N hydrochloric acid was refluxed for 2½ hours. Solvent was distilled off in vacuo and the residue stirred with dilute sodium hydroxide and benzene. The benzene layer was separated, dried over sodium sulfate and concentrated to dryness leaving a residual yellow oil, crude 2-amino-5-chloro-2'-methoxybenzo-phenone. No attempt was made to crystallize the amine but it was then dissolved in 150 cc. of ether, chilled in an ice bath and 20 cc. of water added. Then 3.1 g. of bromoacetyl bromide was slowly added with the simultaneous addition of 1N sodium hydroxide to keep the reaction mixture slightly alkaline. The organic layer was separated, washed with water and dried over sodium sulfate. After distillation of solvent, a yellow oil remained which crystallized on standing. Recrystallization from acetonitrile afforded 2-bromoacetamino-5-chloro-2'-methoxy-benzophenone, m.p. 129°–130.5°.

A solution of 2.4 g. of 2-bromoacetamino-5-chloro-2'-methoxybenzophenone in 100 cc. of 20 percent (v/v) ammonia in methanol was kept at room temperature for 17 hours. Methanol and ammonia were distilled off in vacuo and the residue dissolved in benzene and water. The organic layer was dried over sodium sulfate and the solvent then evaporated in vacuo. The residue was crystallized from a mixture of benzene and hexane to give 7-chloro-5-(2-methoxyphenyl)-3H-1,4-benzodiazepin-2 (1H)-one, which after drying at 100° in vacuo melted at 205.5°–206.5°.

EXAMPLE 28

6-Chloro-2-chloromethyl-4-phenylquinazoline 3-oxide (61.0 grams, 0.2 moles) was added portionwise, during 40 minutes, to a stirred solution of pyrrolidine (99.6 grams, 1.4 moles) in methanol (240 ml.). The reaction mixture soon became homogeneous and about 45 minutes after addition was complete, yellow crystals of the product started to precipitate. The mixture was stirred for a total period of 22 hours at room temperature. The product was then filtered off, washed with cold methanol (100 ml.), followed by ethanol-petroleum ether (250 ml. of 1:4 mixture), yielding the product 7-chloro-5-phenyl-2-pyrrolidino-3H-1,4-benzodiazepine 4-oxide, as yellow prisms, m.p. 194°–196°C. Recrystallization from methanol-acetone, and from acetone, gave pale yellow prisms, m.p. 197°–198°C.

EXAMPLE 29

A capsule dosage form can be obtained as follows:

| Formulation | Per Capsule |
|---|---|
| 7-Chloro-2-(β-diethylaminoethylamino)-5-phenyl-3H-1,4-benzodiazepine mono-hydrochloride | 10.2 mg. |
| Lactose, USP | 164.9 mg. |
| Cornstarch, USP | 30.0 mg. |
| Talc, USP | 5.0 mg. |
| Total Weight | 210.0 mg. |

Procedure:
1. Mix the drug with lactose and cornstarch in a suitable mixer.
2. Further blend the mixture by passing through a Fitzpatrik Comminuting Machine with a 01A screen with knives forward.
3. Return the blended powder to the mixer, add the talc and blend thoroughly.
4. Fill into 04 hard shell gelatin capsules on a Parke-Davis or similar type capsulating machine.

EXAMPLE 30

A parenteral dosage formulation can be prepared as follows:

This drug is not stable in solution under extended storage conditions. It is therefore prepared in duplex ampuls, one containing the dry drug and the other containing the special diluent. The solution is intended for intramuscular injection.

Dry Fill
Ampul 5 cc

7-Chloro-2-(β-diethylaminoethylamino)-

| | Special Diluent 2 cc Per Ml. |
|---|---|
| 5-phenyl-3H-1,4-benzodiazepine monohydrochloride | 100 mg. |

A parenteral grade of the drug, fiber free, is filed into the ampul using a Diehl Mater electric filler or other suitable-type filler. The ampuls are sealed and sterilized at 255°F. for 2 hours.

Immediately before use the powder is solubilized with the following solution

| | | Special Diluent 2 cc Per Ml. |
|---|---|---|
| Polysorboate 80, USP | | 40.0 mg. |
| Benzyl Alcohol, USP | | 15.0 mg. |
| Maleic Acid | | 16.0 mg. |
| Propylene Glycol | | 207.0 mg. |
| Sodium Hydroxide | q.s. to pH | 3.0 |
| Water for Injection | q.s. to | 1.0 ml. |

In a suitable container under an atmosphere of nitrogen dissolve in the following order in part of the Water for Injection the propylene glycol, benzyl alcohol, Polysorbate 80, and maleic acid. Make the solution up to volume, filter through an 02 Selas candle filter and fill into 2 cc. flint ampuls. The filling should be done under an atmosphere of nitrogen. Seal the ampuls and sterilize at 212°F for 30 minutes. Inspect the ampuls, discarding any that leak or contain fibers.

Similarly, capsule and parenteral dosage formulations of the other compounds included within the purview of the present invention may be obtained in accordance with conventional pharmaceutical practice.

We claim:

1. A compound selected from the group consisting of compounds of the formula:

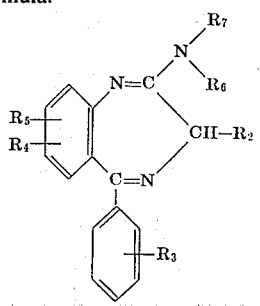

and pharmaceutically acceptable acid addition salts thereof; wherein $R_2$ is selected from the group consisting of hydrogen and lower alkyl; $R_3$, $R_4$ and $R_5$ are each selected from the group consisting of halogen, hydrogen, trifluoromethyl, lower alkyl, lower alkylthio, lower alkyl-sulfinyl, lower alkyl-sulfonyl, cyano, amino, lower alkanoylamino, nitro, di-lower alkylamino and lower alkoxy; and $R_6$ and $R_7$ are selected from the group consisting of, individually, lower alkyl and, taken together with the nitrogen atom to which they are joined, morpholino and a 5 or 6 membered saturated monoheterocyclic ring containing the said nitrogen atom as the only heteroatom and no more than five carbon atoms.

2. A compound as defined in clam 1 wherein $R_4$ is halogen and is joined to the benzodiazepine nucleus in position-7; $R_2$ and $R_5$ are both hydrogen, $R_3$ is hydrogen and halogen and $R_6$ and $R_7$ is taken together with the nitrogen atom and represents piperidine, i.e., 7-halo-5-($R_3$-phenyl)-2-piperidino-3H-1,4-benzodiazepine wherein $R_3$ is hydrogen and halogen.

3. A compound as in claim 2 wherein the 7-halo-group is a 7-chloro group and $R_3$ is hydrogen.

4. A compound as in claim 1 wherein $R_4$ is halogen, and is joined to the benzodiazepine nucleus in position-7, $R_2$ and $R_5$ are both hydrogen, $R_3$ is hydrogen and halogen, and $R_6$ and $R_7$ are both lower alkyl.

5. A compound as defined in claim 4 wherein $R_4$ is chlorine and $R_3$ is hydrogen, i.e., 7-chloro-2-dilower alkyl-amino-5-phenyl-3H-1,4-benzodiazepine.

6. A compound as defined in claim 5 wherein $R_4$ is chloro and $R_6$ and $R_7$ are both methyl, i.e., a compound of the formula 7-chloro-2-dimethylamino-5-phenyl-3H-1,4-benzodiazepine.

7. A compound selected from the group consisting of compounds of the formula:

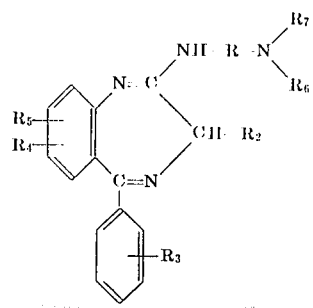

and pharmaceutically acceptable acid addition salts thereof; wherein $R_2$ is selected from the group consisting of hydrogen and lower alkyl; $R_3$, $R_4$ and $R_5$ are each selected from the group consisting of halogen, hydrogen, trifluoromethyl, lower alkyl, lower alkylthio, lower alkyl-sulfinyl, lower alkyl-sulfonyl, cyano, amino, lower alkanoylamino, nitro, di-lower alkylamino and lower alkoxy; $R_6$ and $R_7$ are selected from the group consisting of individually, lower alkyl and, taken together with the nitrogen atom to which they are joined, morpholino and a 5 or 6 membered saturated monoheterocyclic ring containing the said nitrogen atom as the only hetero atom and no more than five carbon atoms and R is lower alkylene.

8. A compound as defined in claim 7 wherein $R_2$, $R_3$ and $R_5$ are all hydrogen; $R_4$ is halogen and is joined to the benzodiazepine nucleus in position-7; R is lower alkylene and $R_6$ and $R_7$ are both lower alkyl, i.e., a compound of the formula 7-halo-2-($\beta$-dilower alkylamino lower alkyleneamino)-5-phenyl-3H-1,4-benzodiazepine.

9. A compound as in claim 7 wherein $R_2$, $R_3$ and $R_5$ are all hydrogen; $R_4$ is chlorine and is joined to the 7-position of the benzodiazepine; R is ethylene and $R_6$ and $R_7$ are both ethyl, i.e., a compound of the formula 7-chloro-2-($\beta$-diethylaminoethylamino)-5-phenyl-3H-1,4-benzodiazepine.

10. A compound selected from the group consisting of compounds of the formula:

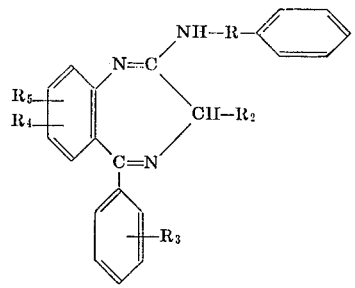

and pharmaceutically acceptable acid addition salts thereof; wherein $R_2$ is selected from the group consisting of hydrogen and lower alkyl; $R_3$, $R_4$ and $R_5$ are each selected from the group consisting of halogen, hydrogen, trifluoromethyl, lower alkyl, lower alkylthio, lower alkyl-sulfinyl, lower alkyl-sulfonyl, cyano, amino, lower alkyanoylamino, nitro, di-lower alkylamino and lower alkoxy; and R is lower alkylene.

11. A compound as defined in claim 10 wherein $R_2$, $R_3$ and $R_5$ are all hydrogen; $R_4$ is chlorine and is joined to the benzodiazepine nucleus in position-7 and R is ethylene, i.e., a compound of the formula 7-chloro-2-phenethylamino-5-phenyl-3H-1,4-benzodiazepine.

12. A compound selected from the group consisting of compounds having the formula of

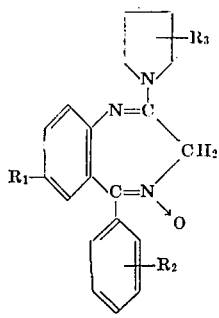

and pharmaceutically acceptable acid addition salts thereof
wherein $R_1$ and $R_2$ are selected from the group consisting of hydrogen, halogen, lower alkyl and trifluoromethyl and $R_3$ is selected from the group consisting of hydrogen and lower alkyl.

13. 7-$R_1$-5-($R_2$phenyl)-2-pyrrolidino-3H-1,4-benzodiazepine 4-oxide
wherein $R_1$ and $R_2$ are selected from the group consisting of hydrogen, lower alkyl, halogen and trifluoromethyl.

14. 7-chloro-5-phenyl-2-pyrrolidino-3H-1,4-benzodiazepine 4-oxide.

15. A member selected from the group consisting of the compound of the formula

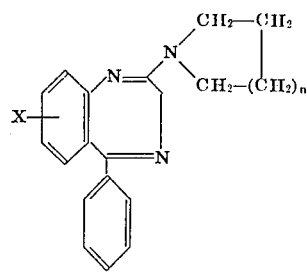

wherein *n* is 1–2 and x is selected from the group consisting of hydrogen and chloro, and the 4-oxide thereof.

* * * * *